Jan. 29, 1957 R. F. ROWE 2,779,812
JUNCTION BOX FOR BALLAST TRANSFORMER
Filed Oct. 25, 1952
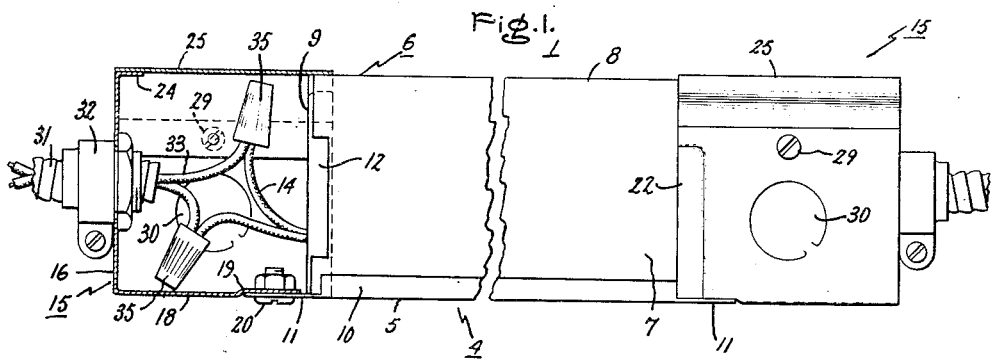
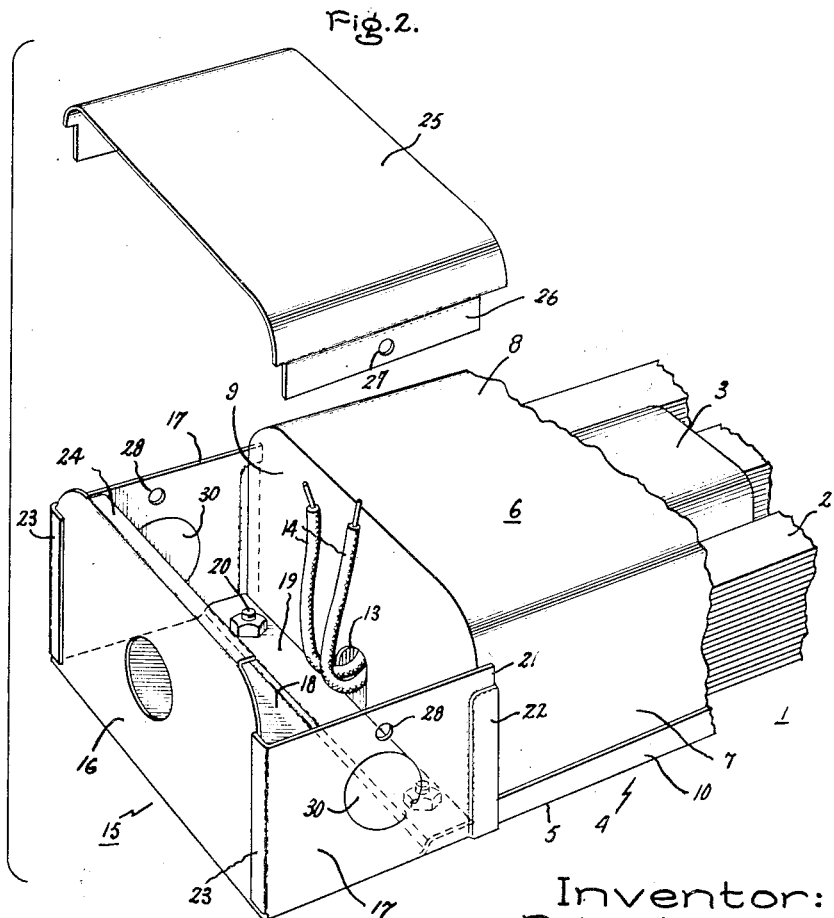
Inventor:
Robert F. Rowe,
by *Robert G. Ives*
His Attorney.

United States Patent Office 2,779,812
Patented Jan. 29, 1957

2,779,812

JUNCTION BOX FOR BALLAST TRANSFORMER

Robert F. Rowe, Fort Wayne, Ind., assignor to General Electric Company, a corporation of New York Application October 25, 1952, Serial No. 316,832

2 Claims. (Cl. 174—50)

This invention relates to fluorescent lighting ballast transformers and more particularly to a ballast transformer having a junction box attached to the case thereof for making external connections.

Ballast transformers used with fluorescent lamps are conventionally provided with a metal case which surrounds and protects the core and windings and which is mounted in the fixture in which the lamps are arranged. In installing fluorescent lamp fixtures, it has in the past been necessary to install a separate junction box for making the necessary electrical connections between the external wiring system and the fixture. It is, therefore, desirable to provide a ballast transformer having a junction box attached to its case thereby eliminating the necessity for providing a separate junction box when installing the lamp fixture. It is also desirable that the junction box be attachable to ballast transformers already in existence.

An object of this invention is therefore to provide an improved ballast transformer having a junction box attached thereto.

Another object of this invention is to provide a junction box for a ballast transformer.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects provides a ballast transformer comprising a core with coils positioned thereon and a case enclosing said coils having side, top and bottom portions and two end walls. Flanges are respectively formed at each end of the case at the base of the end walls and the end wall of at least one end of the case has an opening formed therein through which the coil leads extend. A junction box is arranged at the one end of the case having side, base and end wall portions and with its base portion being secured to the flange at the one end of the case. The junction box has a cover removably secured to its side portions and knock-out portions are formed in the junction box communicating with the interior thereof so that external connections may be made with the coil leads.

In the drawing, Fig. 1 is a side elevational view, partly in section, showing a ballast transformer equipped with two junction boxes in accordance with this invention; and Fig. 2 is a partly exploded fragmentary view in perspective further illustrating the improved ballast transformer construction of this invention.

Referring now to the drawing, there is shown a ballast transformer generally identified as 1 having a suitable core 2 on which coils 3 are arranged. A case generally identified as 4 encloses the core 2 and coils 3 and is formed of a base member 5, a cover member 6 having integrally formed side portions 7 and a top portion 8, and end wall members 9. It will be seen that the longitudinal edges of the bottom member 5 have tabs 10 formed thereon folded upwardly to engage the outer surfaces of side portions 7 of cover 6 and that the bottom member 5 is also provided with extensions 11 extending beyond the end walls 9 thus forming flanges. End walls 9 rest on the extension portions or flanges 11 of base 5 and about the ends of case 6. The vertical edges of the end walls 9 have tabs 12 formed thereon bent over to engage the outer surfaces of side portions 7 of cover 6. At least one of the end walls 9 has an opening 13 formed therein through which coil leads 14 extend.

In order to make the external connections to the coil leads 14, a junction box generally identified as 15 is provided. The junction box 15 has an integrally formed end wall 16, side portions 17 and bottom portion 18. An indentation 19 is formed in the outer edge of bottom portion 18 which engages the upper surface of flange 11 of base 5 so that the balance of the bottom surface of bottom portion 18 is flush with the bottom surface of the bottom member 5 of case 4. Suitable mating openings are formed in flange 11 and indentation 19 of bottom portion 18 thereby permitting indentation 19 to be secured to flange 11 by means of suitable screws 20 thus securing the junction box 15 to the case 4. The outer vertical edges 21 of side portion 17 have indentations 22 formed thereon respectively engaging tabs 12 of end walls 9 of case 4 and tabs 10 on bottom member 5 of case 4. The inner vertical edges of side portions 17 have tabs 23 formed thereon respectively bent over and engaging the outer surface of end wall portion 16 of junction box 15. The upper edge of end wall portion 16 has an inwardly extending tab 24 formed thereon. Junction box 15 is provided with a cover member 25 conforming generally to the configuration of cover 6 of case 4 and having indentations 26 formed on its sides. Cover member 25 is arranged overlapping and engaging the upper surfaces of tab 24 of end wall portion 16 and top portion 8 of cover member 6 while the indentations 26 are respectively arranged within the confines of the junction box and respectively engaging the inner walls of side portions 17. Mating openings 27 and 28 are respectively formed in indentations 26 of cover 25 and side portions 17 of junction box 15 and suitable screws 29 arranged in these openings removably secure cover 25 to junction box 15.

Suitable knock-out portions 30 are formed in the end wall, side and bottom portions 16, 17 and 18 of junction box 15, as is well-known in the art, thus permitting suitable electrical connections, such as by armored cable 31 and connector 32, to be made to the junction box. Thus, the wires 33 of armored cable 31 may be connected to the leads 14 of ballast transformer 1 by means of suitable connectors 35. It will also be readily apparent that a terminal board may be positioned in the junction box 15 with the leads 14 and external wiring being connected thereto.

It will now be readily apparent that this invention provides an improved ballast transformer having the junction box removably bolted thereto which thereby eliminates the necessity for providing and installing a separate junction box when installing the fluorescent lamp fixture. This junction box further facilitates the connections of the ballast transformer to the external wiring and also to the lamp.

While I have shown and described a particular embodiment of this invention, further modifications and improvements will occur to those skilled in the art. I intend, therefore, that this invention not be limited to the specific forms shown and I intend in the appended claims to cover all modifications which do not depart from the spirit and scope of this invention.

What I claim as new and desire to secure by Letters Patent of the United States is:

1. In combination, a case including a base member, a cover member having integrally formed side and top portions and a pair of end wall members; said base member having end portions respectively extending beyond said end wall members forming flanges at both ends of said case, said base member having tabs formed along its longitudinal edges respectively engaging said cover side wall portions, each of said end wall members having tabs formed along its vertical edges respectively engaging said cover side portions, the end wall of at least one end of said case having an opening formed therein for admitting electrical leads to the interior thereof and a junction box arranged at said one end of said case and including integrally formed end wall, base and side portions; said junction box base portion having an indentation formed in its outer edge engaging the upper surface of said flange at said one end of said case and having the balance of its bottom surface flush with the bottom surface of said case base member, means for removably securing said junction box base portion indentation to said flange thereby securing said junction box to said case, said junction box side portions respectively having indentations formed in their outer vertical edges respectively engaging said tabs of said end wall member at said one end of said case and said tabs of said case base member, said junction box side portions respectively having tabs formed on their inner vertical edges respectively engaging the outer surface of said junction box end wall portion, said junction box end wall portion having an inwardly projecting tab formed on its upper edge, a cover member for said junction box having its ends respectively engaging the upper surfaces of said junction box end wall portion tab and said case cover member, said cover member having indentations respectively formed in its side edges respectively engaging the inner surfaces of said junction box side portions, and means for removably securing said junction box cover member to said junction box side portions, said junction box having knock-out portions formed therein for communicating with the interior thereof whereby external connections may be made to said leads.

2. A junction box adapted to be arranged at one end of an enclosing case having side, end, bottom and top walls, said box comprising integrally formed end wall, base and side portions, said base portion having an indentation formed in its outer edge adapted to engage and be removably secured to the upper surface of a flange formed at the base of one of said end walls of said case whereby the balance of the bottom surface of said base portion is flush with said bottom wall of said case, said side portions respectively having indentations formed in their outer vertical edges adapted to respectively engage said side walls of said case, said side portions respectively having tabs formed on their inner vertical edges respectively engaging the outer surface of said end wall portion, said end wall portion having an inwardly projecting tab formed on its upper edge, a cover member having one end engaging the upper surface of said end wall tab and its other end adapted to engage said top wall of said case, said cover member having indentations formed in the side edges respectively engaging the inner surfaces of said side portions, and means for removably securing said cover member to said side portions, said junction box having knock-out portions formed therein communicating with the interior thereof whereby external connections may be made therein.

References Cited in the file of this patent

UNITED STATES PATENTS

| | | |
|---|---|---|
| 990,161 | Paiste | Apr. 18, 1911 |
| 1,698,252 | Ashe | Jan. 8, 1929 |
| 1,965,437 | Staehle | July 3, 1934 |
| 1,966,301 | Lewis | July 10, 1934 |
| 2,055,624 | Dicksen | Sept. 29, 1936 |
| 2,059,217 | Emlen | Nov. 3, 1936 |
| 2,133,944 | Allen | Oct. 25, 1938 |
| 2,226,670 | Pratt et al. | Dec. 31, 1940 |